United States Patent
Kudrimoti et al.

(12)

(10) Patent No.: US 6,751,193 B1
(45) Date of Patent: Jun. 15, 2004

(54) METHOD AND APPARATUS FOR CONTROLLING DATA TRANSFER BETWEEN TWO STATIONS

(75) Inventors: Abhijit S. Kudrimoti, Poway, CA (US); Mark R. Gibbard, San Diego, CA (US); Abhijit G. Shanbhag, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/105,531

(22) Filed: Jun. 26, 1998

(51) Int. Cl.[7] .................... H04L 12/28; H04B 7/216; H04J 3/16
(52) U.S. Cl. .............. 370/231; 370/335; 370/468; 370/252; 370/448; 455/452.1
(58) Field of Search .................. 370/229–236, 370/329, 332, 333, 335–338, 341, 342, 347–348, 431, 436, 437, 439, 441, 443, 447, 448, 461–462, 468, 455; 455/450–452, 509–510; 709/226–235, 232, 229, 532, 610; 710/20, 52, 53, 58, 60

(56) References Cited

U.S. PATENT DOCUMENTS

| | | | |
|---|---|---|---|
| 5,583,869 A | | 12/1996 | Grube et al. ................. 370/347 |
| 5,588,003 A | * | 12/1996 | Ohba et al. .................. 370/468 |
| 5,625,877 A | * | 4/1997 | Dunn et al. .................. 370/468 |
| 5,666,348 A | | 9/1997 | Thornberg et al. ........... 370/230 |
| 6,052,385 A | * | 4/2000 | Kanerva ...................... 370/468 |
| 6,081,536 A | * | 6/2000 | Gorsuch et al. ............. 370/468 |
| 6,088,578 A | * | 7/2000 | Manning et al. ............. 370/347 |
| 6,388,999 B1 | * | 5/2002 | Gorsuch et al. ............. 370/335 |
| 6,418,148 B1 | * | 7/2002 | Kumar et al. ................ 370/468 |

FOREIGN PATENT DOCUMENTS

| | | |
|---|---|---|
| EP | 0804006 | 10/1997 |
| WO | 9909657 | 2/1999 |

* cited by examiner

*Primary Examiner*—Steven H. D. Nguyen
(74) *Attorney, Agent, or Firm*—Philip Wadsworth; Thien T. Nguyen; Thomas R. Rouse

(57) ABSTRACT

A method of and apparatus for controlling data transfer between two stations comprises a link manager for controlling allocation of available channels in a plurality of communications links. In each of the communications links data is transferred between two stations in at least one channel. Data for transfer from a data source is buffered in a data buffer. A controller determines latency in the buffer from the amount of data in the buffer and the rate at which data is being output from the buffer. The controller generates a request for a change in the allocation of channels in a communications link between two stations depending on the latency in the buffer and preset threshold values. The link manager is responsive to a request generated by the controller either to allocate a different number of channels to the communications link or to generate a refusal of the request.

19 Claims, 4 Drawing Sheets

METHOD AND APPARATUS FOR CONTROLLING DATA TRANSFER BETWEEN TWO STATIONS

BACKGROUND OF THE INVENTION

I. Field of the Invention

The present invention relates to a method and apparatus for controlling data transfer between two stations.

II. Description of the Related Art

IS-95 is an over-the-air interface standard which, together with its derivatives such as IS-95-A, IS-99 and IS-707, IS-657 and ANSI J-STD-008 etc. (referred to herein collectively as the IS-95 standards), defines an interface for implementing a digital personal communication system using code division multiple access (CDMA) signal processing techniques. A personal communication system configured substantially in accordance with the use of IS-95 is described in U.S. Pat. No. 5,103,459 entitled "System and Method for Generating Signal Waveforms in a CDMA Personal communication System" assigned to the assignee of the present invention and incorporated herein by reference.

FIG. 1 is a schematic diagram representing a personal communication system configured in accordance with IS-95. As is typical for most personal communication systems, IS-95 allows mobile telephone service to be provided to a set of wireless stations or terminals 10 (typically cellular telephones or "mobiles") using a set of base transceiver stations (BTS) 12 coupled by a base station controller (BSC) 14 and a mobile switching center (MSC) 16 to a public switched telephone network (PSTN) 18. During a call from a wireless terminal 10, the terminal 10 interfaces with one or more base stations 12 in a communications link using CDMA modulated radio frequency (RF) signals. The RF signal transmitted from the base station 12 to the wireless terminal 10 is referred to as the forward link, and the RF signal transmitted from the wireless terminal 10 to the base station 12 is referred to as the reverse link.

Under the IS-99 and IS-707 standards (referred to hereinafter simply as IS-707), an IS-95 compliant communications system can also provide data communications services. Data communications services allow digital data to be exchanged using a wireless terminal 10 and the RF interface to one or more base stations 12. Examples of the type of digital data typically transmitted using the IS-707 standard include computer files and electronic mail. Under IS-95A and IS-707, frames are transmitted once every 20 mS (milliseconds).

The IS-95B Standard has recently been developed to enable multiple traffic channels to be assigned to a wireless terminal by a base station in a communications link in both forward and reverse directions. IS-95B defines formats for supplemental traffic channels for different rate sets, but is silent as to how supplemental channels should be assigned in the communications link. There are only a finite number of traffic channels and, as such, the channels are a limited resource. Furthermore, it is not unusual in the transfer of data for the rate at which the data is delivered to vary with time. At some times the data rate may be relatively high and at others relatively low, the delay tolerances of several data sources is not rigid. It is wasteful of resources simply to assign a maximum number of channels to a communications link in order to ensure that the link is able to match the rate at which data is transferred with the maximum rate at which data may be delivered for transfer over the link.

The invention aims to overcome or at least minimize some of the above discussed disadvantages and problems.

The invention will be described in the following with reference to a CDMA system in which the invention may be embodied. A CDMA system is preferred because of the advantages that such a system offers over other communications systems. The invention is, however, not limited to being embodied in a CDMA system and can be applied equally to any communications system in which plural channels may be assigned in a communications link.

SUMMARY OF THE INVENTION

In one aspect the invention provides an apparatus for controlling data transfer between two stations, the apparatus comprising: a link manager for controlling allocation of available channels in a plurality of communications links in each of which communications links data is transferred between two stations in at least one channel; a data buffer for buffering data from a data source; and a controller for determining a parameter representing the buffering of data in the buffer and for generating a request for a change in the allocation of channels in a communications link between two stations depending on the parameter, and wherein the link manager is responsive to a request generated by the controller to allocate a different number of channels to the communications link or to generate a refusal of the request.

In another aspect the invention provides a method of controlling data transfer between two stations, the method comprising: controlling allocation of available channels in a plurality of communications links in each of which communications links data is transferred between two stations in at least one channel; buffering data from a data source; determining a parameter representing the buffering of data in the buffer; generating a request for a change in the allocation of channels in a communications link between two stations depending on the parameter; and responding to a generated request by allocating a different number of channels to the communications link or generating a refusal of the request.

BRIEF DESCRIPTION OF THE DRAWINGS

The above and further features of the invention are set forth with particularity in the appended claims and together with advantages thereof will become clearer from consideration of the following detailed description of an exemplary embodiment of the invention given with reference to the accompanying drawings.

In the drawings.

DETAILED DESCRIPTION OF THE PREFERRED EMBODIMENTS

Figure 2:
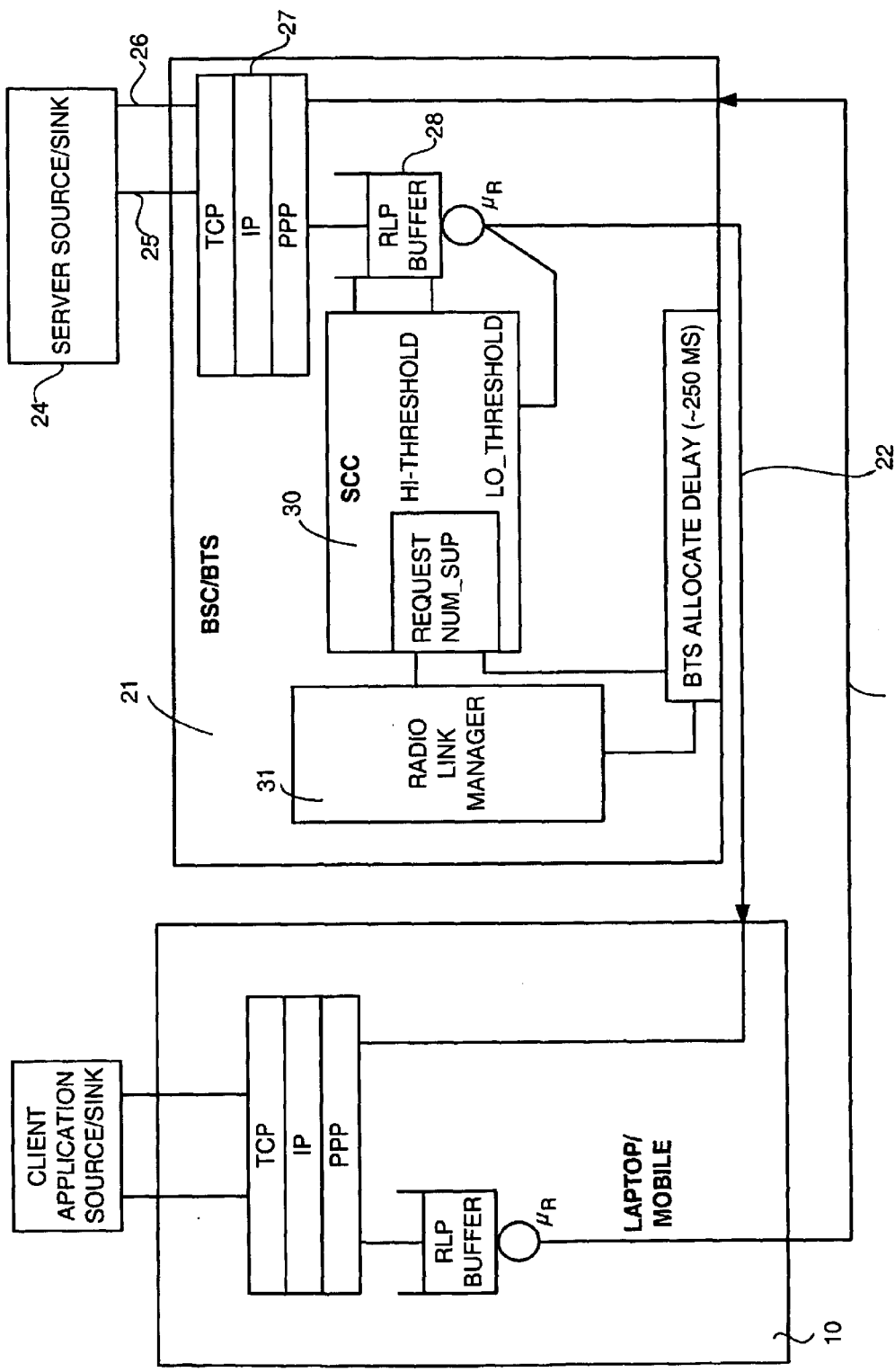
FIG. 2 is a schematic diagram representing a portion of a communications system embodying the invention.

Referring now to FIG. 2 of the accompanying drawings, there is shown a portion of a communications system comprising a wireless terminal 10 (illustrated as a laptop computer and mobile telephone in combination). Operations that will be described in detail herein after may be performed either by one or more base transceiver stations 12 (BTS), or a base station controller 14 (BSC), or be distributed between both the one or more BTSs and the BCS. In order to simplify the following description a base transceiver station 12 and base station controller 14 are shown in FIG. 2 as a combined BSC/BTS controller 21. A communications link comprising a forward link 22 and a reverse link 23 has been established between the terminal 10 and the controller 21.

The controller 21 is connected to receive data from and transmit data to a data source/sink 24 via links 25, 26. The links may be a local area network, or ordinary telephone or ISDN lines in a PSTN, and the data source/sink 24 may for example be a file server or the so-called Internet or World Wide Web. Typically the data from such a source is delivered in packets in uneven bursts. The controller 21 therefore comprises a TCP/IP or Point to Point Protocol (PPP) buffer 27 and a Radio Link Protocol (RLP) buffer 28. The buffers 27,28 are used by software in the implementation of the TCP/IP, PPP, and RLP protocols. These protocols are well documented and are therefore well known and understood by those possessed of the appropriate skills. For example the RLP for a single code channel is defined in IS-707 and for multiple code channels in IS-707A. As such they need not be described in any greater detail herein.

Figure 1:
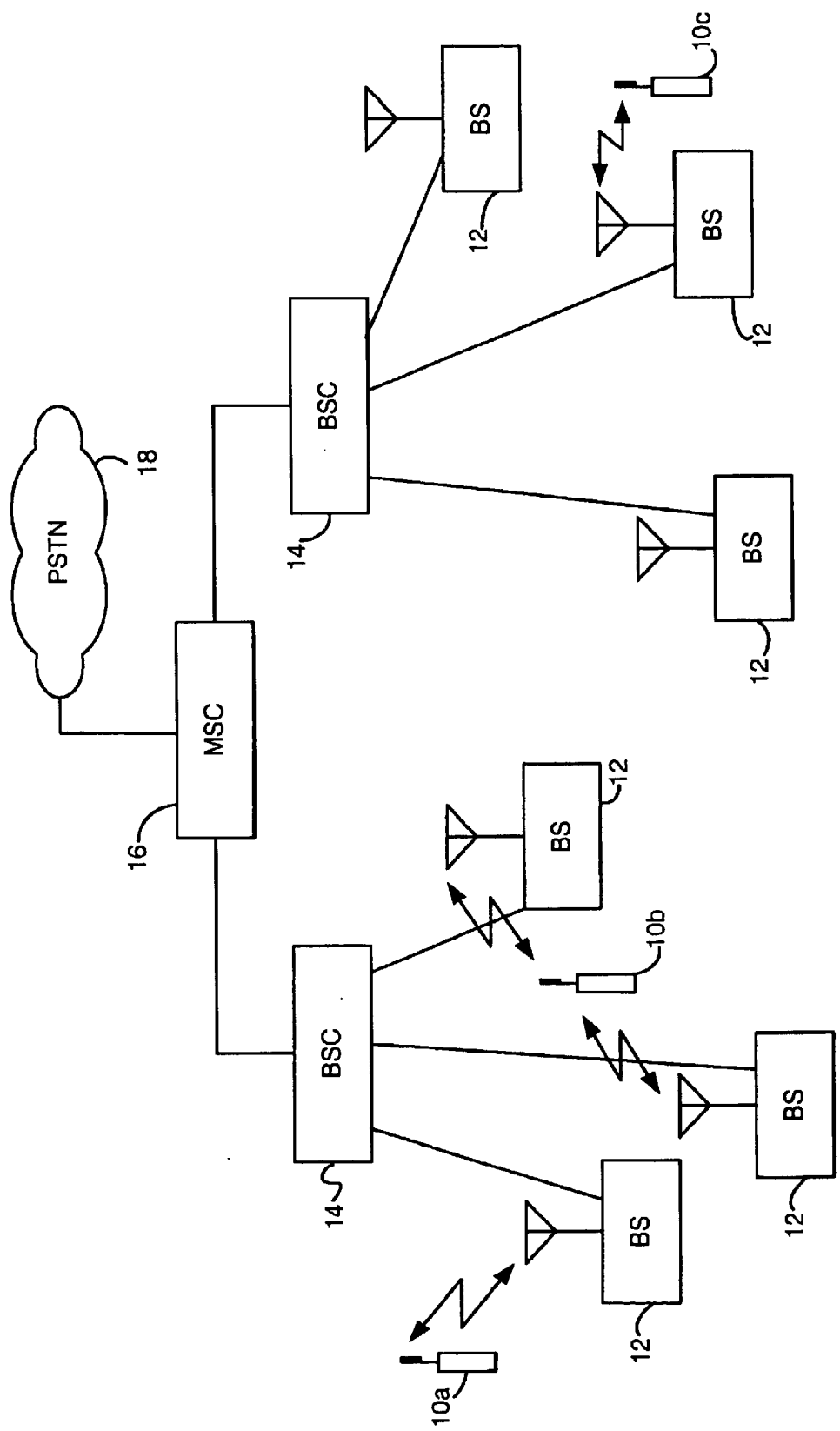
FIG. 1 is a schematic diagram representing a personal communication system, as already described herein above.

Incoming data from the source 24 is buffered into the RLP buffer 28 and from there it is output onto the forward link 22 at a forward link service rate $\mu_F$ determined by a supplemental channel controller (SCC) 30. The BSC/BTS 13 further comprises a radio link manager (RLM) 31 which manages the allocation of radio links (such as links 22 and 23) between each base transceiver station (BTS) 12 (see FIG. 1) and wireless terminals 10 that are currently communicating, or require to communicate, via the BTS. In response to requests from the supplemental channel controller 30 the radio link manager 31 allocates (or declines to allocate) additional or "supplemental" channels to augment data transfer between the BTS 12 and the wireless terminal 10.

It should be noted that there will in fact be a separate PPP buffer 27, RLP buffer 28 and supplemental channel controller (SCC) 30 for every data call (connection to/from a mobile) that the system is capable of establishing. The SCCs within the BSC operate independently of each other. That is to say, there is no direct interaction between them. In the interests of clarity, therefore, operation of only one SCC 30 will be described in detail in the following. It will of course be appreciated that other SCCs within the BSC/BTS 13 may be, in reality, executing the same operation at the same time.

The supplemental channel controller SCC 30 has stored within it various parameters which it uses to monitor the flow of data through the radio link protocol (RLP) buffer 28. There are many ways in which the flow of data thorough the buffer may be measured. For example, the amount of data in the buffer (queue length), the rate at which data is arriving in the buffer, and the rate at which data is growing in the buffer are all indicators of data flow. The presently preferred measure is "latency", which is a measure of the time taken for data to pass through the RLP buffer 28. Latency is calculated by determining the amount of data in the RLP buffer 28 and dividing that amount by the rate at which data is being output from the RLP buffer 28 onto the forward link 22.

The rate at which data is output, of course, depends on the number of channels that have been allocated to the link by the radio link manager 31, and the latency is therefore a measure of whether the allocated channels are being usefully employed by the forward link 22. The latency is compared to two thresholds, a high threshold (HI_threshold) and a low threshold (LO_threshold). These thresholds are preset at suitable values. For example, the high threshold may be set at 1 sec. and the low threshold at 0.2 sec. If the latency has a value between these thresholds then the allocated channels are deemed to be usefully employed. If the latency is greater than the high threshold, then there are insufficient channels allocated to the link. If the latency is less than the low threshold then the allocated channels are being under utilized by the link and may be more usefully employed elsewhere.

Figure 3:
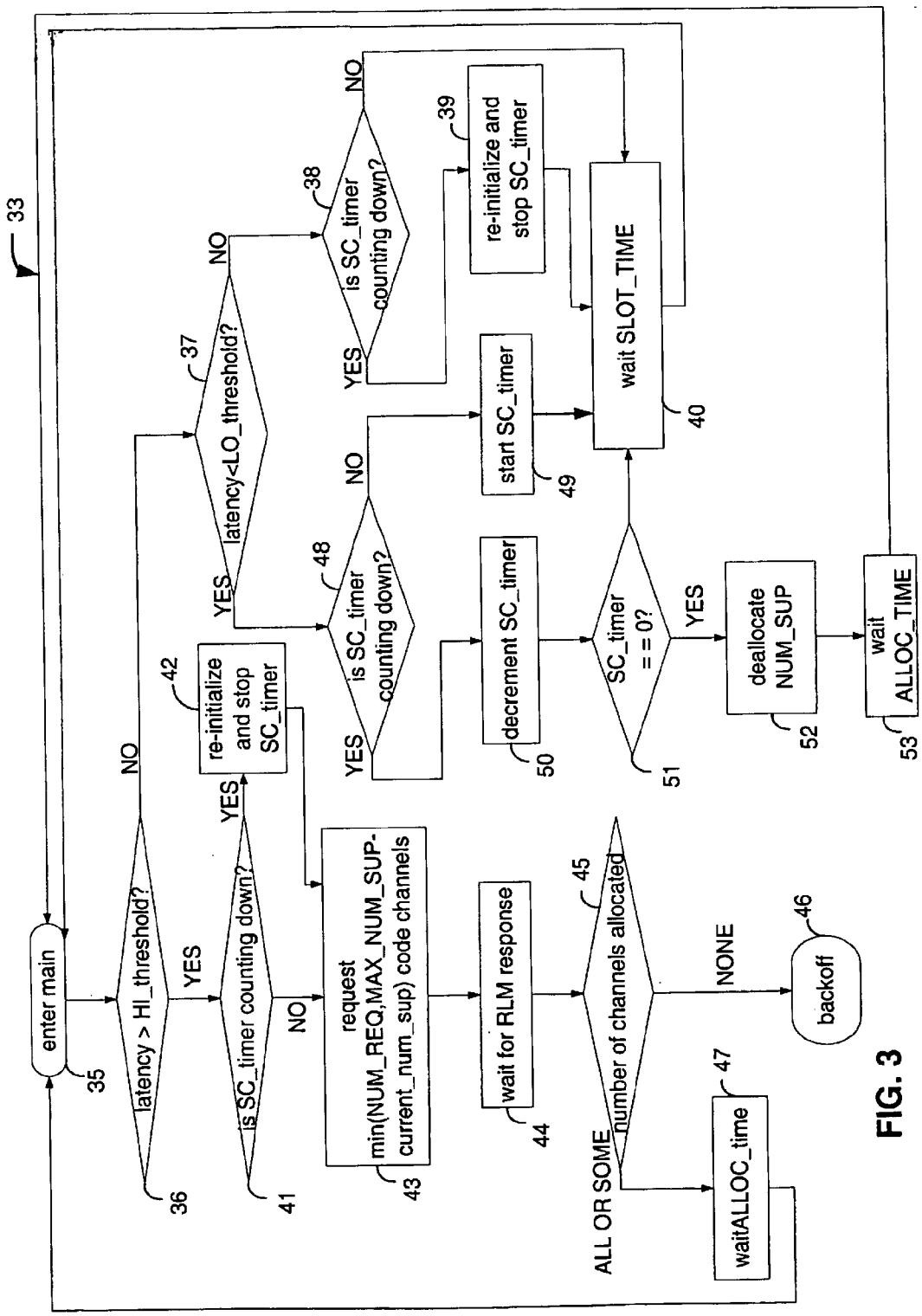
FIG. 3 is a flow diagram showing a main sequence of operations performed by a supplemental channel controller in the system of FIG. 2.
Figure 4:
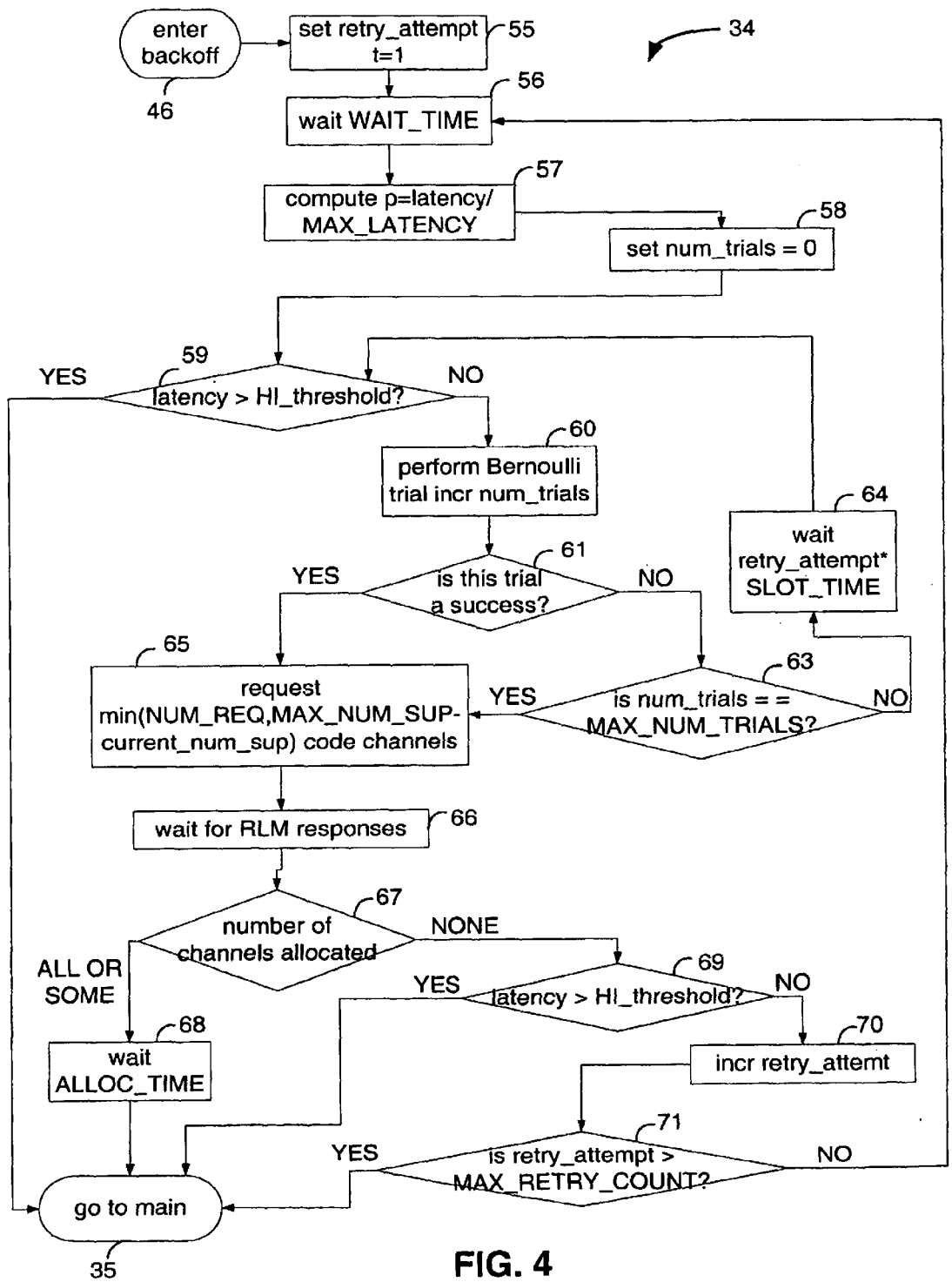
FIG. 4 shows a back off sequence of operations performed by the supplemental channel controller.

FIG. 3 of the accompanying drawings is a flow diagram showing a main sequence 33 of operations performed by the supplemental channel controller (SCC) 30 in monitoring the transfer of data from the source/sink 24 to the wireless terminal 10 and requesting the allocation of supplemental channels by the radio link manager (RLM) 31. FIG. 4 of the accompanying drawings shows a back off routine 34 of operations performed by the supplemental channel controller (SCC) 30 in the event that a request is declined by the RLM 31. Under IS-95A and IS-707, frames are transmitted once every 20 mS. The SCC 30 is therefore arranged to execute either the main routine 33 or the back off routine 34 every 20 mS, or a multiple thereof depending on wait states which are embedded in each of the routines 33, 34. In FIGS. 3 and 4 elliptical blocks represent entry into or exit from the routine, square blocks represent actions performed by the routine, and hexagonal blocks represent decisions take within the routine.

The main routine will first be described with reference to FIG. 3. The main routine is entered at block 35 and at block 36 the latency is calculated and compared to the high threshold. If the latency is less than the high threshold then the routine continues at block 37 by comparing the latency with the low threshold. If the latency is greater than the low threshold, then this means that the latency is within a range that is deemed acceptable and the allocated channels in the link are being usefully employed.

Under these conditions, the main routine continues at block 38 by looking at a low latency state hold timer (SC_timer) to see whether the timer is counting down. The conditions under which the SC timer is started will be described in detail herein below. For the moment it should be noted that the SC timer is included to avoid channels being unnecessarily "deallocated" and reallocated (i.e. released from the current data call for use in another data call) if the latency just momentarily falls below the low threshold. It takes time to deallocate and reallocate channels, typically 250 mS, and it would be wasteful of resources to do so repeatedly each time the latency moved out of range. The SC timer is arranged to measure a predetermined period of time, e.g. 1 sec., determined by the SC_timer counting 20 mS. time slots (1 sec. is equal to 50 such timeslots). If the SC counter is counting, then it is reinitialized and stopped at block 39, because the conditions do not require any change in allocation. Otherwise the routine moves straight on to block 40 where it waits for a slot period (SLOT_TIME) (20 mS) before returning to reenter the main routine at block 35.

In block 36 if the latency is found to be greater than the high threshold, then routine proceeds to block 41 where it again inspects the SC timer to see whether the timer is counting down. If the SC counter is counting, then it is reinitialized and stopped at block 42, and the routine then moves on to block 43. Otherwise, the routine moves straight on to block 43 where a request is sent by the supplemental channel controller (SCC) 30 to the radio link manager (RLM) 31 for further supplemental channels. The number of channels requested is calculated as the minimum of (1) the maximum number of supplemental channels that may be requested in a given request (NUM_REQ) and (2) the difference between the maximum allowed number of channels in the link (MAX_NUM_SUP) and the current number of allocated channels (current_NUM_SUP). As represented by block 44, once the request has been sent the routine waits for the RLM 31 to respond to the SCC 30.

In block 45, when the RLM 31 responds, the routine determines how many of the requested channels have been allocated. If none of the requested channels have been allocated, then the routine enters the back off routine at block 46. The back off routine is described in greater detail herein below with reference to FIG. 4. If all or some of the requested channels have been allocated, then the routine waits for a period of time (ALLOC_TIME) and then reenters the main routine again at block 35. ALLOC_TIME is defined as the minimum acceptable time between requests to allocate or deallocate supplemental channels, and conveniently may be set to, say, fifty time slots, i.e. 1 second. This wait is included to prevent the SCC 30 from requesting further channels too quickly after additional channels have been allocated to it. This also avoids the generation of control signals within the system that occurs when such requests are made. A rapid further allocation of channels may well be unnecessary, and the wait represented by block 47 avoids such a waste of resources from occurring. If no channels are allocated then the back off routine is entered at block 46. The back off routine is described in detail herein below with reference to FIG. 4.

Looking again at block 37, if the latency is less than the low threshold, then this means that the latency is below a range in which the cost of maintaining all active supplemental channels is justifiable. The routine then continues by entering block 48 and looking at the value in the SC timer. If the SC counter is not counting down, then it is started at block 48 and the routine enters block 40 where it waits for a slot period, as previously described. Otherwise the value in the SC counter is decremented at block 50. The SC counter value is then checked, as represented by block 51, to determine whether it has yet reached zero. If the SC counter value has not reached zero, then the routine again returns to block 40. However, if the value in the SC timer has reached zero, then this indicates that the latency has been less than the minimum deemed acceptable (LO_Threshold, e.g. 0.2 sec.) for a period of time determined by SC_timer, e.g. 1 sec. As represented by block 52, the SCC will then request deallocation of a number of supplemental channels (NUM_SUP), i.e. the SCC 30 will notify the RLM 31 that the supplemental channels allocated to it are not being usefully employed. Then the SCC waits for a period of time equal to ALLOC_TIME, as represented by block 53 (see block 47) before reentering the main routine at block 35.

The back off routine will now be described with reference to FIG. 4. The back off routine is entered from the main routine at block 46 (see also FIG. 3) when no channels are allocated by the radio link manager (RLM) 31 in response to a request by the supplemental channel controller (SCC) 30. On entry into the back off routine a counter (retry-attempt) is set to 1, as represented by block 55. The SCC then waits for a period of time determined by WAIT_TIME (1 second) in block 56. This is to allow the system to update system parameters, which could result in a change in the allocation requirements, before the SCC 30 sends another request to the RLM 31. Next, in block 57, a probability value p is calculated by dividing the latency by a predetermined maximum latency value (MAX_LATENCY). The maximum latency value is a period of time calculated from the size of the buffer (BUF_SIZE) and a fundamental rate. The fundamental rate depends on the rate set for the transfer of data in a channel and may have a value of 7950 bps (Rate_Set1) or 13100 bps (Rate_Set2). The maximum latency is calculated from the equation:

$$MAX\_LATENCY = BUF\_SIZE/FUNDAMENTAL\_RATE.$$

Once the maximum latency is known the probability p can be calculated from the equation:

$$p = \text{latency}/MAX\_LATENCY.$$

Next, as represented by block 58, a trials counter (num_trials) is set to zero. In block 59 the latency is compared with the high threshold value. If the latency is less than the high threshold, then there is no longer a need to request supplemental channels because the latency has fallen to an acceptable level during the 1 second wait after the back off routine was entered. The SCC therefore exits the back off routine at block 35 by entering again the main routine. If, however, the latency is still higher than the high threshold, then a Bernoulli trial is performed at block 60. A Bernoulli trial is equivalent to tossing a coin and gives a "yes"/"no" result on a random basis. Unlike a coin, however, the probability of a "yes" result is not 50%. Instead, the probability of the result of the Bernoulli trial being a "yes" is set equal to the probability value p. The higher the value of p, the more likely that the result of the trial will be a success, "yes". The reason for this is to increase the likelihood of success if the need for supplemental channels is greater; i.e. the latency is high. A trials counter (num_trials) is also incremented at block 60.

The result of the Bernoulli trial is examined at block 61. If the trial has been unsuccessful, i.e. the result is a "no" (more likely if p is low), the trials counter is compared in block 63 with a predefined maximum number (MAX_NUM_TRIALS). The maximum number is conveniently 50, although other values may, of course, be chosen instead as appropriate. If the trial count is less than the maximum, then at block 64 the routine waits for a period of time calculated as the current value in the retry attempt counter (retry-attempt) multiplied by 20 mS., i.e. the period of one slot. The routine then returns to block 59 where the latency is again compared with the high threshold value.

If, however, the result of the Bernoulli trial is a success ("yes") at block 61 or if the trial count equals the maximum at block 63, then a request is sent at block 65 to the RLM for additional channels. The number of channels requested in block 65 is the same as the number requested in block 43 of FIG. 3. As represented by block 66, once the request has been sent the routine waits for the RLM 31 to respond to the SCC 30.

In block 67, when the RLM 31 responds, the routine determines how many of the requested channels have been allocated. If all or some of the requested channels have been allocated at block 66, then the routine waits for the ALLOC_TIME (1 sec.) during block 68 and then reenters the main routine again at block 35. This wait is included to prevent the SCC 30 from requesting further channels too quickly after additional channel have been allocated to it. A rapid further allocation of channels may well be unnecessary, and the wait represented by block 68 avoids such a waste of resources as well as unnecessary signaling from occurring.

If none of the requested channels have been allocated, then the routine again compares the latency with the high threshold at block 69. If the latency has fallen below the high threshold, then there is no longer a need for further channels to be allocated and the back off routine returns to the main routine at block 35. If, on the other hand, the latency is still higher than the high threshold (indicating that further channels are still required) then the attempt counter (retry_attempt) is incremented at block 70. Then, as represented by block 71, the attempt counter is compared with a predetermined maximum value (MAX_RETRY_COUNT). If the number of retries is equal to the maximum, then the main routine is reentered again at block 35. Otherwise the routine returns to block 56 where it waits for 1 second (WAIT_TIME) before repeating the routine.

There are two effects at play during execution of the back off routine. On the one hand, when the value of p calculated at block 57 is high this will tend to increase the probability of a successful Bernoulli trial occurring, and thus reduce the time between which additional channel requests are made where the need for additional channels is greatest. On the other hand, the routine will steadily increase the time between requests (at block 64) after each retry attempt is made, until a maximum is reached (at block 71) when the back off routine returns to the main routine without any further channels having been allocated to the SCC by the RLM.

Having thus described the invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

We claim:

1. An apparatus for controlling data transfer between two stations, the apparatus comprising:

a link manager for controlling allocation of available channels in a plurality of communications links in each of which communications links data is transferred between the two stations in at least one channel;

a data buffer for buffering data from a data source; and a controller for determining a parameter representing the buffering of data in the buffer and for generating a request for a change in the allocation of channels in a communications link between the two stations depending on the parameter, wherein the link manager is responsive to the request generated by the controller to allocate a different number of channels to the communications link or to generate a refusal of the request, wherein the controller is arranged to respond to a refusal generated by the link manager by waiting for a period of time before generating another request for a change in the allocation of channels, wherein the controller is arranged to record a number corresponding to the number of requests which have previously been generated and to increase the period of time between the generation of requests depending on the recorded number, and wherein the controller is arranged to calculate a probability depending on the amount of data buffered in the buffer and to decide on whether or not to send a request in a random trial depending on the calculated probability.

2. An apparatus as claimed in claim 1, wherein the period of time between a first trial and a second trial is increased when the decision of the first trial is not to send a request.

3. An apparatus as claimed in claim 2, wherein a count is maintained of the number of decisions not to send a request, and a request is sent when the count exceeds a predetermined value.

4. A method of controlling data transfer between two stations, the method comprising:

controlling allocation of available channels in a plurality of communications links in each of which communications links data is transferred between the two stations in at least one channel;

buffering data from a data source;

determining a parameter representing the buffering of data in the buffer;

generating a request for a change in the allocation of channels in a communications link between the two stations depending on the parameter;

responding to the generated request by allocating a different number of channels to the communications link or generating a refusal of the request;

responding to a refusal by waiting for a period of time before generating another request for a change in the allocation of channels;

recording a number corresponding to the number of requests which have previously been generated and increasing the period of time between the generation of requests depending on the recorded number; and calculating a probability depending on the amount of buffered data and deciding on whether or not to send a request in a random trial depending on the calculated probability.

5. A method as claimed in claim 4, wherein the period of time between a first trial and a second trial is increased when the decision of the first trial is not to send a request.

6. A method as claimed in claim 5, wherein a count is maintained of the number of decisions not to send a request, and a request is sent when the count exceeds a predetermined value.

7. An apparatus comprising:

a data buffer to buffer data from a data source for transmission over one or more channels allocated to a communication link for data transfer between two stations; and a controller to determine a latency with respect to the buffered data and to generate a request for a change in allocation of channels to the communication link based on the latency, wherein the latency is compared with a first threshold and the controller generates a request for additional channels if the latency exceeds the first threshold, the controller waits for at least the predetermined period of time after additional channels have been allocated before generating another request wherein, if no additional channels are allocated in response to the request generated by the controller, the controller calculates a probability based, at least in part, on the size of the data buffer and wherein the controller decides whether to send a request for additional channels in a random trial depending on the calculated probability.

8. The apparatus of claim 7 wherein the controller continues to generate requests for additional channels until at least one or more additional channels have been allocated or until a predetermined number of retry attempts has been reached.

9. The apparatus of claim 8 wherein the controller increases the period of time between requests after each retry attempt.

10. The apparatus of claim 7 wherein the latency is compared with a second threshold and wherein the controller generates a request to deallocate channels if the latency falls below the second threshold.

11. The apparatus of claim 10 wherein the controller generates the request to deallocate channels only if the latency has fallen below the second threshold for at least a second predetermined period of time.

12. An apparatus comprising:
- a link manager to control allocation of channels to a communication link for data transfer between two stations;
- a data buffer to buffer data from a data source for transmission over one or more channels allocated to the communication link;
- a controller to determine whether a latency of the buffered data is between a high threshold and a low threshold, inclusive, and to request for a change in the allocation of channels to the communication link if the latency is not between a high threshold and a low threshold, inclusive, the controller to wait for at least a predetermined period of time before generating another request for a change in the allocation of channels to the communication link, wherein
- if no additional channels are allocated in response to the request generated by the controller, the controller calculates a probability based, at least in part, on the size of the data buffer and wherein the controller decides whether to send a request for additional channels in a random trial depending on the calculated probability.

13. The apparatus of claim 12 wherein the controller generates a request for additional channels if the latency exceeds the high threshold, and wherein the controller waits for at least the predetermined period of time after one or more additional channels have been allocated before generating another request.

14. The apparatus of claim 12 wherein the controller generates a request to deallocate channels if the latency falls below the low threshold.

15. The apparatus of claim 14 wherein the controller generates the request to deallocate channels only if the latency has fallen below the low threshold for at least a second predetermined period of time.

16. A method comprising:
- buffering data from a data source for transmission over one or more channels allocated to a communication link;
- determining a latency with respect to the buffered data;
- generating a request for a change in allocation of channels to the communication link based on the latency;
- comparing the latency with a first threshold;
- generating a request for additional channels if the latency exceeds the first threshold;
- calculating a probability based, at least in part, on an amount of buffered data; and
- deciding whether to send the request for additional channels in a random trial depending on the calculated probability; and
- waiting for at least a predetermined period of time before generating another request for a change in allocation of channels.

17. The method of claim 16 wherein requests for additional channels are generated until at least one or more additional channels have been allocated or until a predetermined number of retry attempts has been reached.

18. The method of claim 16 wherein generating the request for the change comprises:
- comparing the latency with a second threshold; and
- generating a request to deallocate channels if the latency falls below the second threshold.

19. The method of claim 18 wherein the request to deallocate channels is generated only if the latency has fallen below the second threshold for at least a second predetermined period of time.

* * * * *